US012578246B2

(12) United States Patent
    Aurich

(10) Patent No.: US 12,578,246 B2
(45) Date of Patent: ***Mar. 17, 2026

(54) HIGH PRESSURE GAS FITTING LEAK DETECTION SYSTEMS AND RELATED METHODS

(71) Applicant: HP Leak Detection LLC, Prescott, AZ (US)

(72) Inventor: Dale Aurich, Prescott, AZ (US)

(73) Assignee: HP Leak Detection LLC, Prescott, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/090,215

(22) Filed: Mar. 25, 2025

(65) Prior Publication Data

US 2025/0224302 A1     Jul. 10, 2025

Related U.S. Application Data

(63) Continuation of application No. 18/482,477, filed on Oct. 6, 2023, now Pat. No. 12,276,578.

(51) Int. Cl.
    *G01M 3/28*          (2006.01)
    *F16L 23/04*         (2006.01)
    *F16L 23/16*         (2006.01)

(52) U.S. Cl.
    CPC ........... *G01M 3/2853* (2013.01); *F16L 23/04* (2013.01); *F16L 23/167* (2013.01); *F16L 2201/30* (2013.01)

(58) Field of Classification Search
    CPC ..... F16L 23/04; F16L 23/167; F16L 2201/30; G01M 3/2853; G01M 3/042; G01M 3/02
    See application file for complete search history.

(56) References Cited

U.S. PATENT DOCUMENTS

| | | | |
|---|---|---|---|
| 3,141,685 A | 7/1964 | Watts | |
| 4,019,371 A | 4/1977 | Chaplin | |
| 5,277,455 A | 1/1994 | Graves | |
| 5,461,904 A | 10/1995 | Baker | |
| 6,367,843 B1 | 4/2002 | Fetzer | |

(Continued)

FOREIGN PATENT DOCUMENTS

| | | | |
|---|---|---|---|
| DE | 19507736 | 9/1995 | |
| GB | 2274919 A * | 8/1994 | ............ G01M 3/042 |

(Continued)

OTHER PUBLICATIONS

DE-19507736—Machine Translation—English (Year: 1995).*

(Continued)

*Primary Examiner* — Illiam S. Choi

(74) *Attorney, Agent, or Firm* — IPTechLaw

(57) ABSTRACT

Implementations of a gas leak indication system may include a ring including a flange extending from an interior surface of the ring, the flange including two seal channels on either side of the flange, and the ring including a flow opening extending into a projection extending from an exterior surface of the ring; an extender threadedly coupled into a side opening in the projection, the extender including a flow opening therethrough; an indicator threadedly coupled onto the extender, the indicator including a flow channel extending therethrough; and a cap coupled over an end of the indicator by a friction fit.

20 Claims, 9 Drawing Sheets

(56)             References Cited

U.S. PATENT DOCUMENTS

| | | |
|---|---|---|
| 7,716,967 B2 | 5/2010 | Woods et al. |
| 11,326,978 B2 | 5/2022 | Obillo |
| 2005/0046180 A1 | 3/2005 | Tombler et al. |
| 2018/0017463 A1 | 1/2018 | Stonitsch |

FOREIGN PATENT DOCUMENTS

| | | | | |
|---|---|---|---|---|
| KR | 2015052720 A | * | 5/2015 | |
| KR | 2020011116 A | * | 2/2020 | .......... G01M 3/2853 |

OTHER PUBLICATIONS

KR-2015052720-A—Machine Translation—English (Year: 2015).*
KR-2020011116-A—Machine Translation—English (Year: 2020).*
Webpage: Freudenberg Oil & Gas Technologies; Vector Techlok®
Clamp Connector, https://www.fogt.com/clamp-connector, accessed
Aug. 9, 2023.
WIPO Search Report and Written Opinion, PCTUS2450134, WIPO,
Oct. 28, 2024.

* cited by examiner

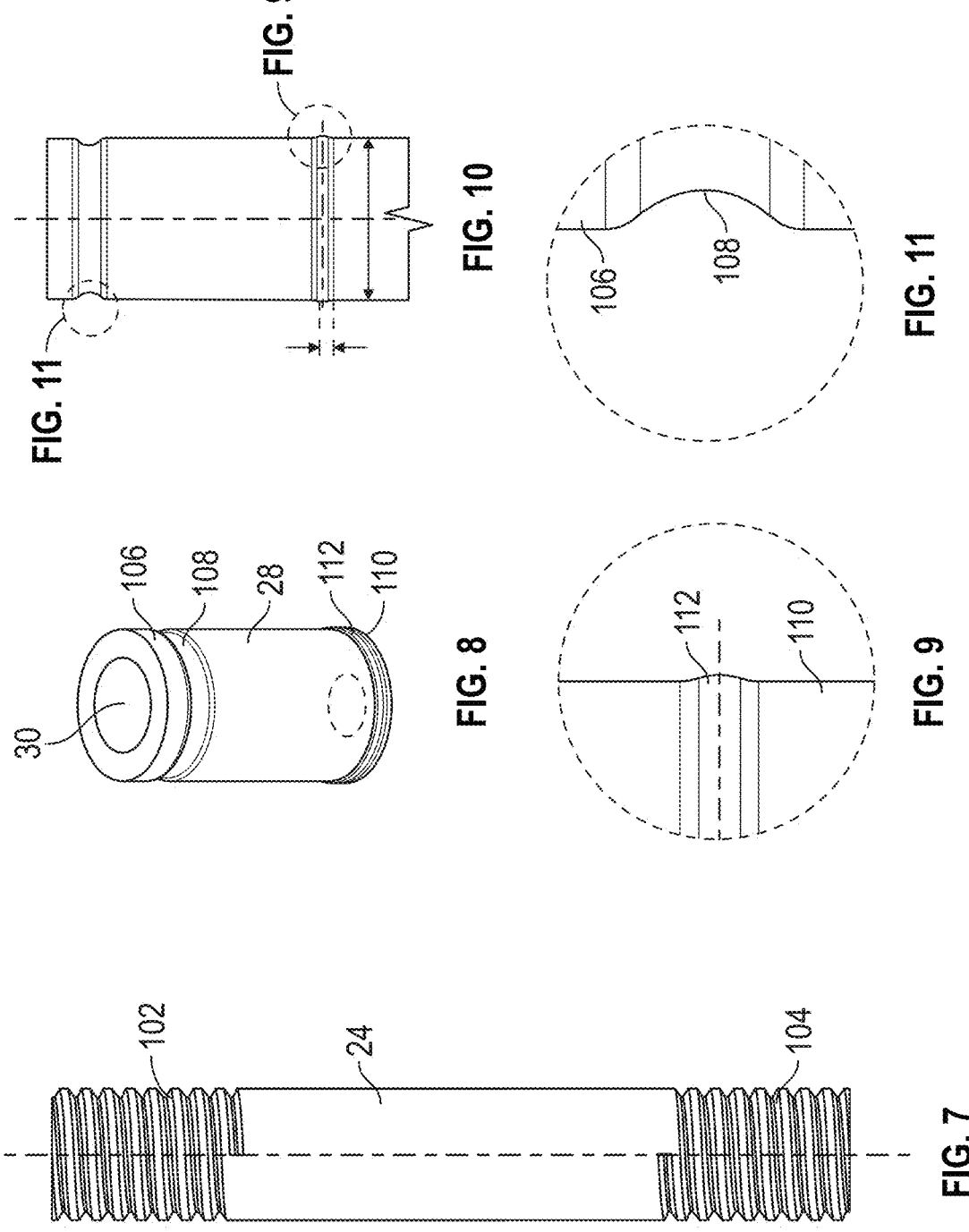

HIGH PRESSURE GAS FITTING LEAK DETECTION SYSTEMS AND RELATED METHODS

CROSS REFERENCE TO RELATED APPLICATIONS

This application is a continuation application of the earlier U.S. Utility Patent Application to Aurich entitled "High Pressure Gas Fitting Leak Detection Systems and Related Methods," application Ser. No. 18/482,477, filed Oct. 6, 2023, now pending, the disclosure of which is hereby incorporated entirely herein by reference.

BACKGROUND

1. Technical Field

Aspects of this document relate generally to systems used for high pressure gas distributions systems. More specific implementations involve leak detection systems.

2. Background

Gas distribution system transport a wide variety of gas types from supplies to points of consumption. Gas distribution system are used in various locations including where gas turbine generators and gas turbines are used.

SUMMARY

Implementations of a gas leak indication system may include a ring including a flange extending from an interior surface of the ring, the flange including two seal channels on either side of the flange, and the ring including a flow opening extending into a projection extending from an exterior surface of the ring; an extender threadedly coupled into a side opening in the projection, the extender including a flow opening therethrough; an indicator threadedly coupled onto the extender, the indicator including a flow channel extending therethrough; and a cap coupled over an end of the indicator by a friction fit.

Implementations of a gas leak indication system may include one, all, or any of the following:

The flow opening of the ring, the flow opening of the extender, and the flow channel of the indicator may be all in fluid communication with each other An outer end of the flow opening in the projection of the ring may be sealed.

The flange may be configured to rest between two hubs of a clamp connector adjacent to a sealring held between the two hubs and the ring may be configured to be held against the two hubs through a clamp coupled with the two hubs.

The indicator may include a flange extending around a circumference of the indicator adjacent to a first end of the indicator adjacent to the extender and a groove extending around the circumference of the indicator adjacent to a second end of the indicator configured to retain a balloon.

The cap may include a groove extending around an interior surface of the cap where the groove is configured to receive the flange of the indicator therein.

When a predetermined flow of gas passes through the flow opening of the ring, the flow opening of the extender, and the flow channel of the indicator, the cap may be configured to disengage from the indicator to fully expose the indicator.

The cap may include a cable coupling a top of the cap to the extender to retain the cap coupled to the extender.

When a flow of gas passes through the flow opening of the ring, the flow opening of the extender, and the flow channel of the indicator, the groove of the cap disengages from the flange of the indicator fully exposing the indicator.

Implementations of a gas leak indication system may include a ring including a flange extending from an interior surface of the ring, the flange configured to extend into and contact two hubs of a clamp connector, the ring including a flow opening extending from the interior surface of the ring into a projection extending from an exterior surface of the ring; and a flow detection system in fluid communication with the flow opening.

Implementations of a gas leak indication system may include one, all, or any of the following:

The flow detection system may include: an extender threadedly coupled into a side opening in the projection, the extender including a flow opening therethrough in fluid communication with the flow opening of the ring; an indicator threadedly coupled onto the extender, the indicator including a flow channel extending therethrough in fluid communication with the flow opening of the extender; and a cap retained over an end of the indicator by a friction fit.

The indicator may include a flange extending around a circumference of the indicator adjacent to a first end of the indicator adjacent to the extender and a groove extending around the circumference of the indicator adjacent to a second end of the indicator configured to retain a balloon.

The cap may include a groove extending around an interior surface of the cap, the groove configured to receive the flange of the indicator therein.

When a predetermined flow of gas passes through the flow opening of the ring, the flow opening of the extender, and the flow channel of the indicator, the cap may be configured to disengage from the indicator to fully expose the indicator.

The cap may include a cable coupling a top of the cap to the extender to retain the cap coupled to the extender.

Implementations of a method of detecting a gas leak in a clamp connector may include providing a ring including a flange extending from an interior surface of the ring, the ring including a flow opening extending from the interior surface of the ring into a projection extending from an exterior surface of the ring; contacting the flange of the ring with two hubs of a clamp connector; securing the ring, the two hubs, and a sealring with a clamp; and detecting a predetermined flow of gas from the flow opening.

Implementations of a method of detecting a gas leak in a clamp connector may include one, all, or any of the following:

Detecting the predetermined flow of gas further may include using a flow detection system in fluid communication with the flow opening.

The flow detection system may include an indicator and a balloon.

The flow detection system may include an extender, an indicator, and a cap.

Detecting the predetermined flow of gas further may include exposing the indicator through disengaging the cap from the indicator using a flow of gas from the flow opening The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 7 is a side view of an implementation of an extender;

FIG. 8 is a perspective view of an implementation of an indicator;

FIG. 9 is a detail view of the flange illustrated in indicator implementation of FIG. 10;

FIG. 10 is a side view of an indicator implementation;

FIG. 11 is a detail view of the groove of the indicator implementation of FIG. 10;

DESCRIPTION

This disclosure, its aspects and implementations, are not limited to the specific components, assembly procedures or method elements disclosed herein. Many additional components, assembly procedures and/or method elements known in the art consistent with the intended gas leak detection system will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such gas leak detection systems, and implementing components and methods, consistent with the intended operation and methods.

Figure 12:
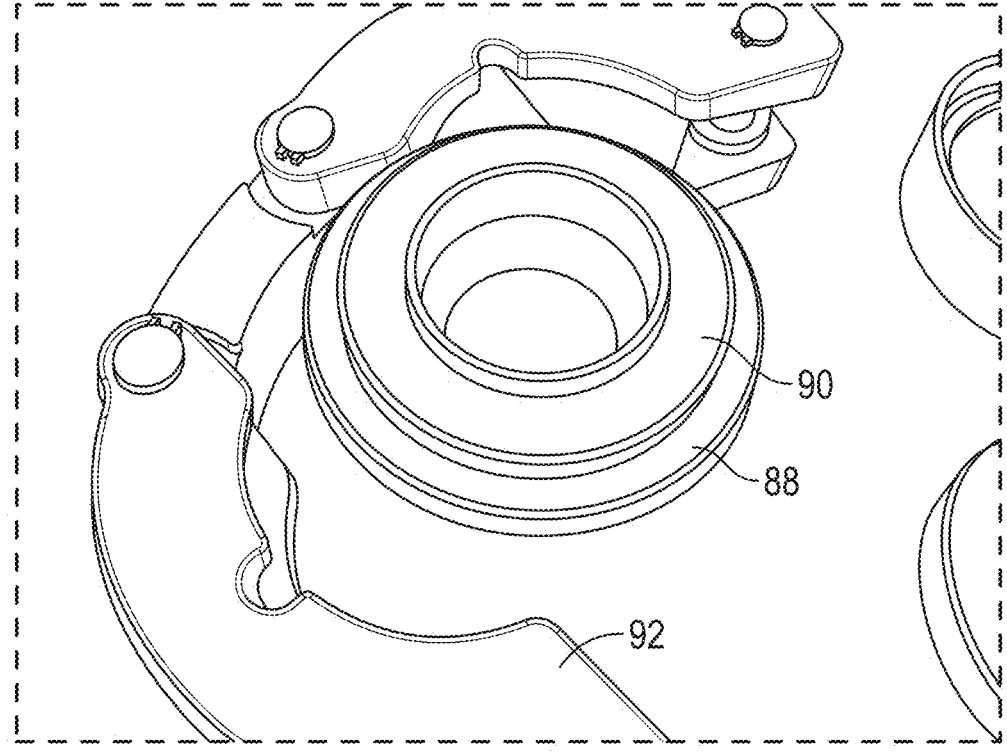
FIG. 12 is a perspective view of an implementation of a hub with a sealring coupled therein with a clamp surrounding the hub.

A clamp connector is used in high pressure gas systems and includes two hubs with flat faces are joined with a sealring. A clamp is then placed over the edges of the two hubs and bolted down around them, forcing the faces of the hubs closer together and against the sealring. The material of the sealring extends into the remaining gap between the faces of the two hubs. One of the challenges of clamp connector systems is that since the flat faces of the hubs never directly contact one another when clamped, getting the faces of the hubs to be parallel or substantially parallel can require the installer to have to hit the hubs during tightening to approximately align them. If the alignment is not ideal, gas leaks from around the sealring/hub interface can occur. Because the clamp covers the entire interface of the two hubs, it is difficult to detect gas leaks from clamp connectors. FIG. 12 illustrates an implementation of a hub 88 with an implementation of a sealring 90 along with an implementation of a clamp illustrated in a disconnected position adjacent to the hub 88.

Figure 15:
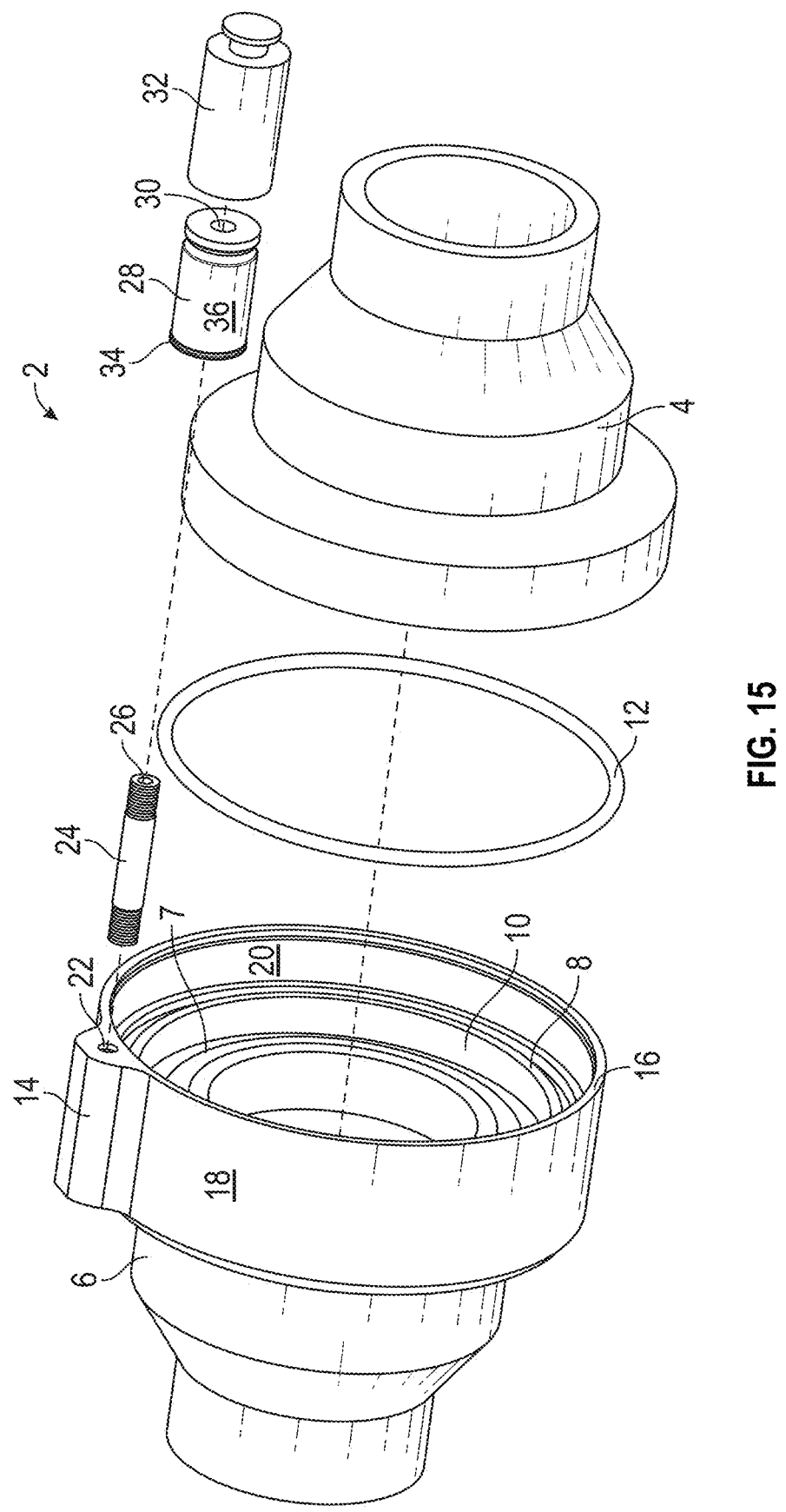
FIG. 15 is an exploded view of an implementation of a gas leak detection system in conjunction with hubs of a clamp connector.

Referring to FIG. 15, an exploded view of an implementation of a gas leak detection system 2 for use with clamp connectors is illustrated. In this view, the components of a corresponding clamp connector are illustrated in the form of hubs 4 and 6. The face 7 of hub 6 is also illustrated against which an o-ring placed in a seal channel is resting (not visible in FIG. 15). Seal channel 8 on the other side of flange 10 is visible in FIG. 15 and is sized to receive o-ring 12 which is designed to rest against the face of hub 4 when hub 4 is placed against the flange 10. Projection 14 extends from the exterior surface 18 of ring 16. As illustrated, the flange 10 extends inwardly from an interior surface 20 of the ring 16.

As illustrated, projection 14 includes a flow opening 22 into which extender 24 is designed to threadedly couple. The extender 24 includes a flow opening 26 that extends all the way through the extender 24. Indicator 28 is threadedly coupled with the extender 24 and includes a flow channel 30 that extends all the way through the indicator 28. Cap 32 couples over the indicator 28 down to flange 34 that extends from outer surface 36 of the indicator 28. The cap 32 is held over the indicator 28 at the flange 34 via a friction fit using structures that will be described in more detail herein.

Figure 1:
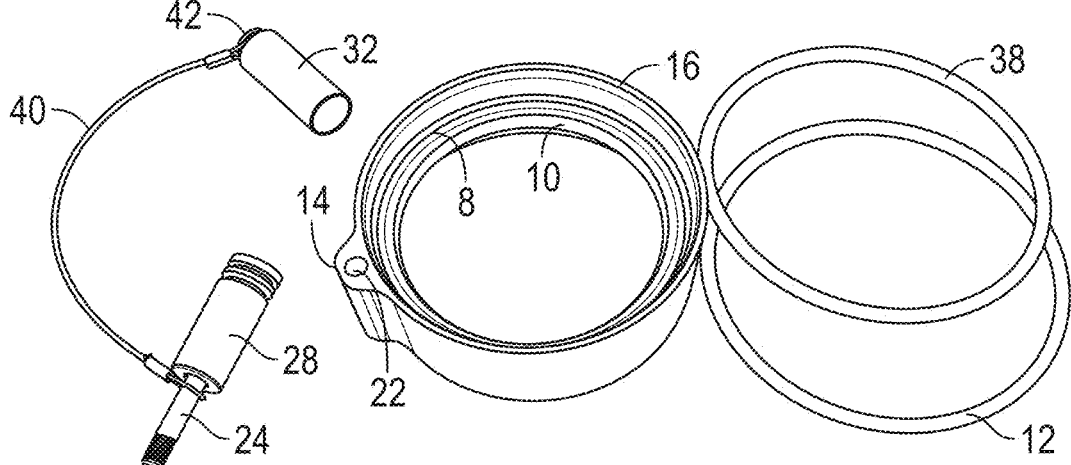
FIG. 1 is a perspective view of the various components of a gas leak indication system including a ring, an extender, an indicator, and a cap along with two o-rings.
Figure 16:
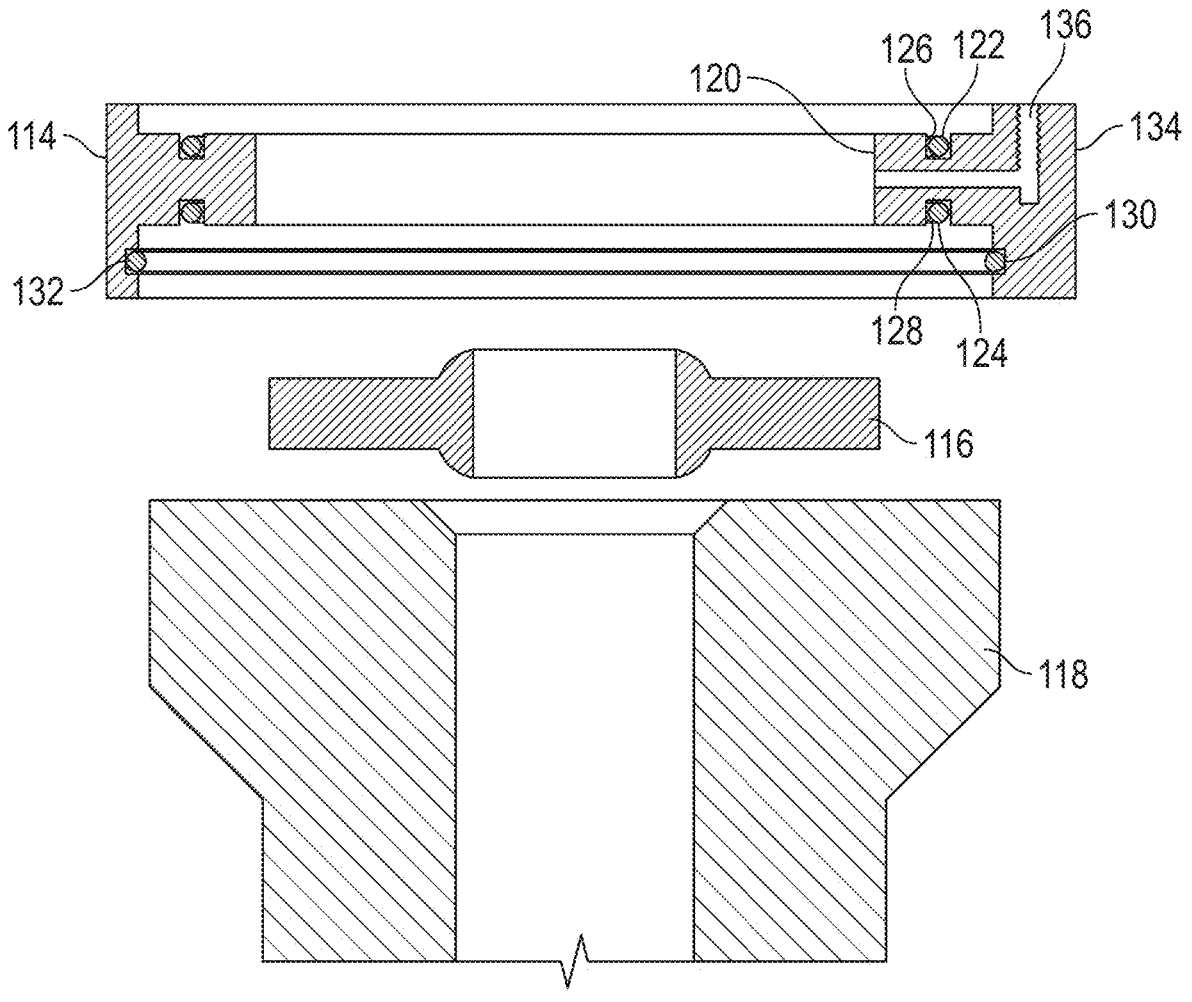
FIG. 16 is an exploded cross sectional view of another ring implementation adjacent to a hub and sealring.

Referring to FIG. 1, the various components of the gas leak indication system 2 are illustrated in a disassembled position over/between hubs 4 and 6. In this position, the exterior surface of the ring 16 is visible, along with the extender 24, indicator 28, and cap 32. While not visible in the black and white views of the figures in this application, the indicator 28 is colored with a color designed to contrast with the metal coloring of the ring and hubs to allow its exposure to become immediately apparent to someone viewing the gas leak indication system 2. In particular implementations, the indicator is colored red using an anodizing process. However, in other implementations, the indicator may be colored using, by non-limiting example, a painting process, a powder coating process, a flame spray process, an etching process, or through use of a metal alloy that has a naturally weathered finish of a particular color. As illustrated in FIG. 16, the cap 32 is dimensioned to cover the indicator 28.

Figure 2:
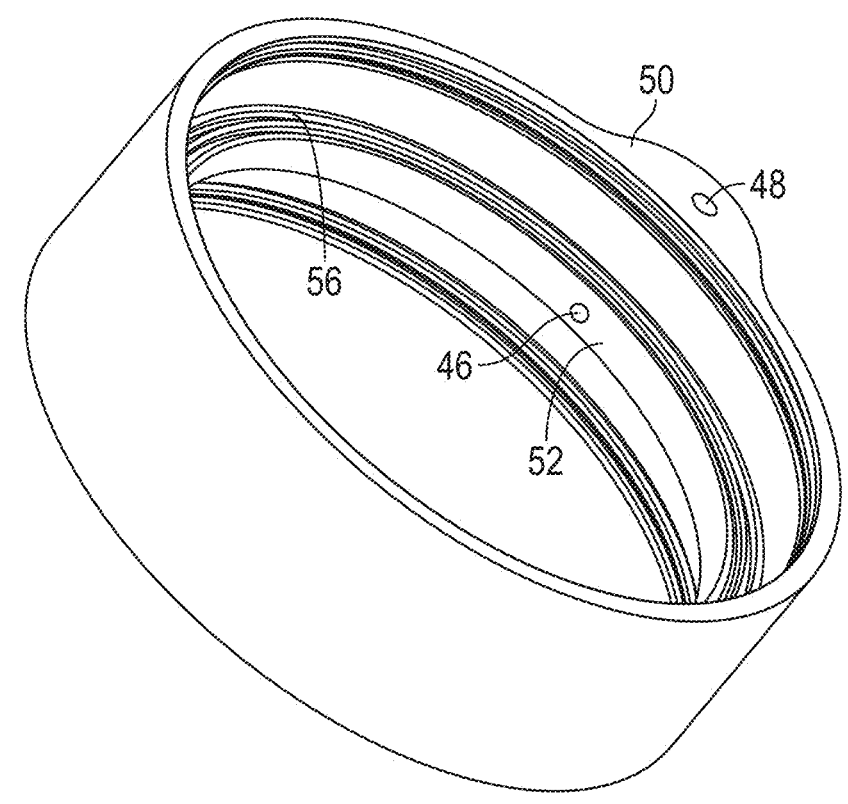
FIG. 2 is a perspective view of an implementation of a ring.

Referring to FIG. 1, the ring 16, o-ring 12, and o-ring 38 are illustrated in an un-assembled position. Here the flange 10 of the ring 16 is visible which includes seal channel 8. The flow opening 22 of the projection 14 is also illustrated next to the assembled extender 24, indicator 28, and cap 32. In FIGS. 1 and 2, a cable 40 is attached around the extender 24 and around the circular projection 42 of the cap 32 to ensure that the cap 32 does not become lost when it releases from the indicator 28. While the use of cable 40 is illustrated in FIGS. 1 and 2, a wide variety of other systems and methods of retaining the cap 32 to the system could be employed, including, by non-limiting example, rope, thread, chain, or any other system of ensuring the cap does not physically separate from the system. In various implementations, the cable 40 may be coiled or curled to enable it to absorb more energy and prevent breakage of the cable in the event of a sudden leak occurring and corresponding loss of the cap.

Figure 3:
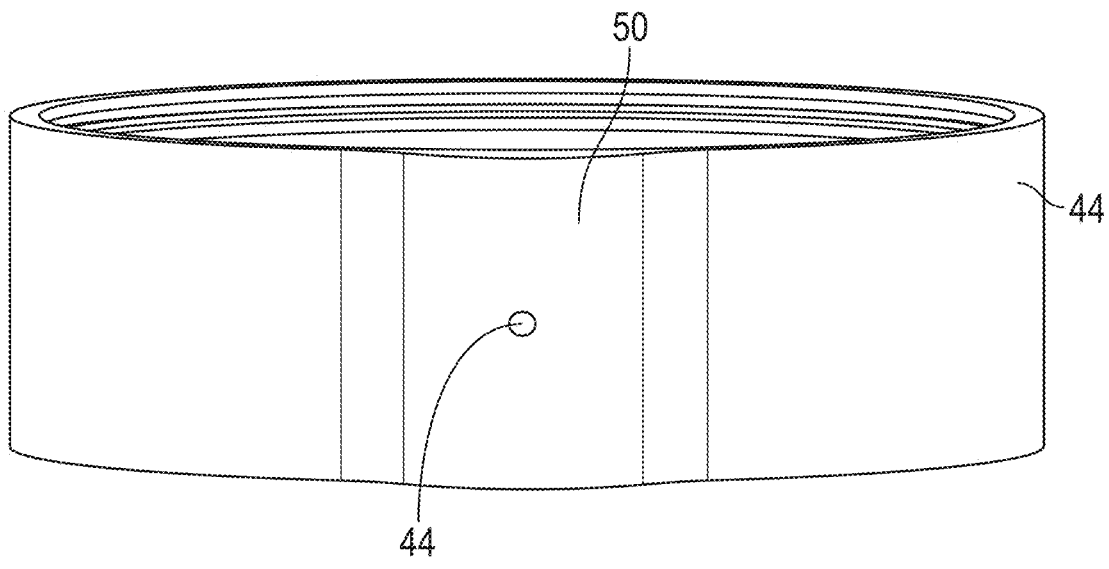
FIG. 3 is a front view of an implementation of a ring.

Referring to FIG. 2, an implementation of a ring 44 is illustrated in a perspective view. Here, the location of flow opening 46 is illustrated, showing that the flow opening 48 of the projection 50 begins on the flange 52 of the ring 44. The seal channel 56 is also illustrated in the flange 52 showing the groove in which the o-rings rest. FIG. 3 is a front view of the ring 44 that shows where the flow opening 46 extends out of the projection 50 which is created during manufacturing of the flow opening 46. Prior to use, the open portion of the flow opening 46 is closed off using a screw, brad, or rivet (not shown in this view).

Figure 13:
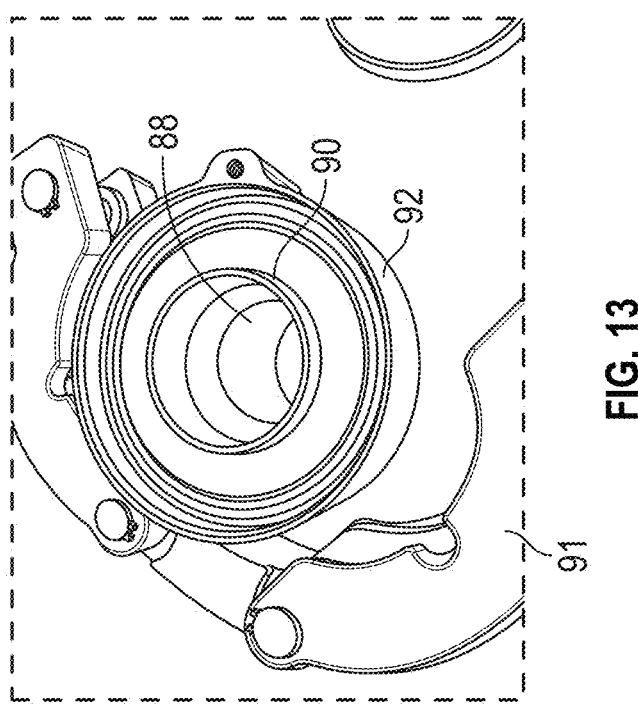
FIG. 13 is a perspective view of the hub implementation of FIG. 12 with a ring implementation installed.

Referring to FIG. 13, the implementation of the hub 88 of FIG. 12 is illustrated with sealring 90 and clamp 91 with ring 94 installed over the hub 88. As illustrated, the projection 96 of the ring 94 is located where the two portions of the clamp 91 are bolted together, which leaves sufficient space for the projection and for the extender to extend beyond the clamp 92 at right angles to the clamp 91. In the various ring implementations disclosed herein, the dimensions of the ring (thickness, flange thickness, o-ring diameter, etc.) are determined by the available space between the clamp and the two hubs of the clamp connector. Accordingly, for smaller clamp connectors, the ring thickness, for example, is thinner while for larger clamp connectors, the ring thickness can be thicker as the tolerance between the hubs and the clamp is correspondingly larger.

Figures 4, 5, 6:
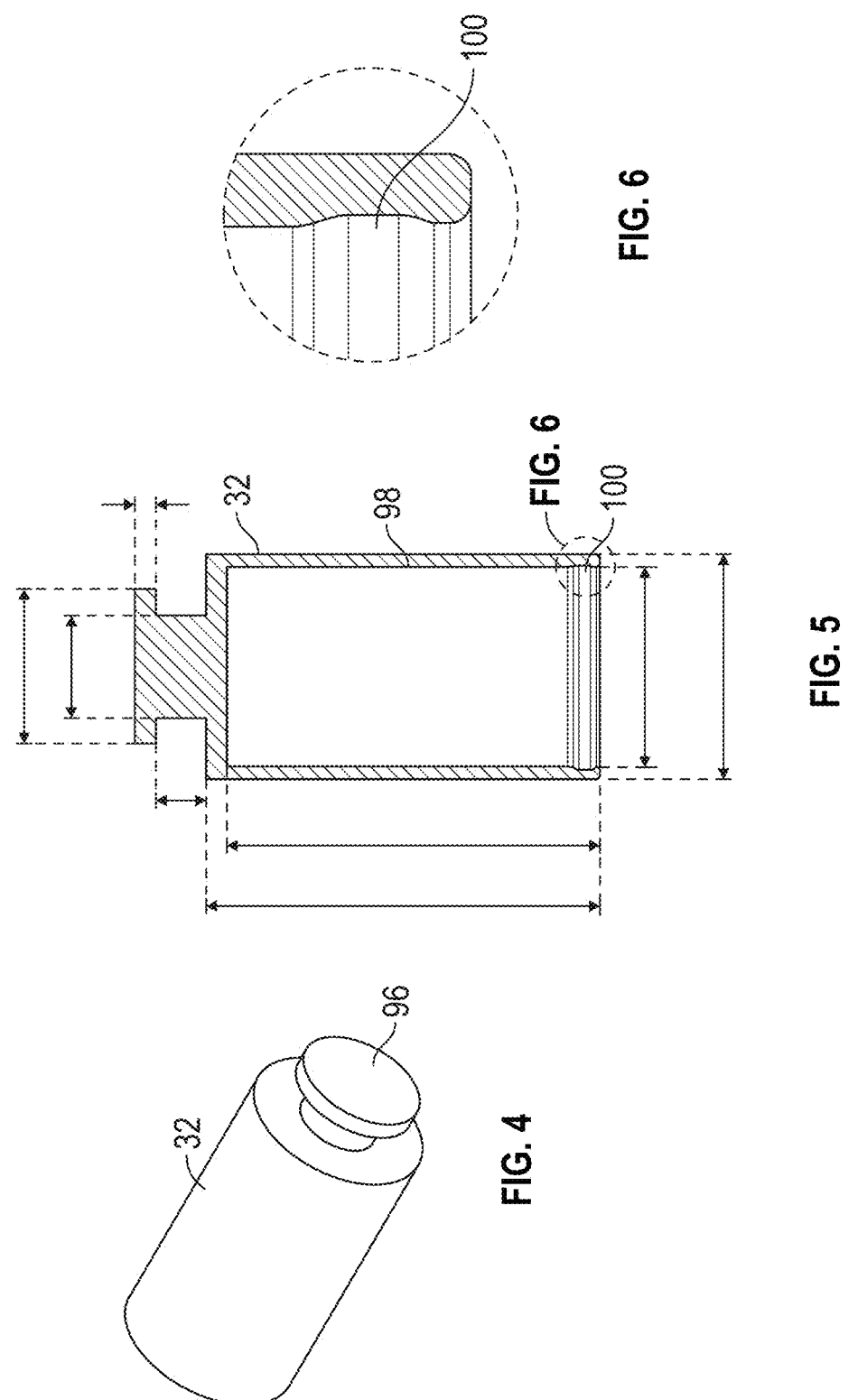
FIG. 4 is a perspective view of an implementation of a cap.
FIG. 5 is a cross sectional view of an implementation of a cap.
FIG. 6 is a detail cross section view of the cap implementation of FIG. 5.

An implementation of the previously described cap is illustrated in more detail in FIGS. 4-6. FIG. 4 illustrates a perspective view of the cap 32 that shows the projection 96 that used to help retain the cap 32 with the gas leak indication system in combination with a cable or other retainer. FIG. 5 is a cross sectional view of the cap 32 that shows how the cap has a constant diameter that corresponds with the diameter of the indicator 28 down to a point along the interior surface 98 of the cap 32 where groove 100 is located that extends around the circumference of the interior surface 98. FIG. 6 is a detail view of the shape of the groove 100, and shows how, in this implementation, the groove is formed of angled and flat surfaces rather than rounded surfaces to aid in forming a friction fit with the flange 112 of FIG. 9 designed to yield at a particular pressure of gas. In other implementations, however, the groove may be formed with rounded surfaces to achieve the desired friction fit. In various implementations, the cap may yield at a pressure of about 2 to about 5 psi, though higher or lower yielding pressures may be used in various implementations.

FIG. 7 illustrates a side view of an implementation of an extender 24 showing threaded ends 102, 104. These threaded ends 102, 104 help form gas-tight connections with the flow opening 22 of the projection 14 and with the indicator 28. FIGS. 9-12 are various views of an implementation of indicator 28. FIG. 8 shows the indicator 28 in perspective view with first end 106 with groove 108 extending around the circumference of the indicator 28. In various system and method implementations, the groove 108 is used to retain an end of a balloon thereto during testing for low pressure leaks. Indicator 28 also includes a second end 110 that includes flange 112 that extends around the circumference of the indicator 28. FIG. 10 illustrates the indicator 28 in a closer side view. FIG. 9 illustrates a detail view of the flange 112 showing how the flange has a rounded profile/cross section, which, because it protrudes, engages with each recess of the groove 100 of the cap 32. This rounded profile/cross section of the flange 112 in combination with the flat surfaces of the groove 100 of the cap 32 helps create the friction fit that is designed to yield at the desired/predetermined gas pressure.

Referring to FIG. 11, the first end 106 of the indicator 28 includes the groove 108. The groove 108 is sized and profiled to retain a balloon, particularly the rounded rubber ring end of a balloon, which is used in place of the cap during low pressure leak monitoring as will be described hereafter.

While the use of a groove/flange combination to hold the cap over the indicator to a desired pressure is illustrated in this document, other mechanical configurations/systems may be used. For example, an o-ring may replace the flange in the indicator and engage in the corresponding flange in the cap to provide the desired friction fit that yields at the desired leak pressure. In such an implementation, the indicator would then have two grooves therein, one for the o-ring and the other for holding a balloon for low pressure testing. In some implementations, however, the groove for the balloon testing may not be used and only the groove for the o-ring may be employed. Similarly, in some indicator implementations, only the flange for retaining the cap may be included and the groove for the balloon testing may be omitted.

Figure 14:
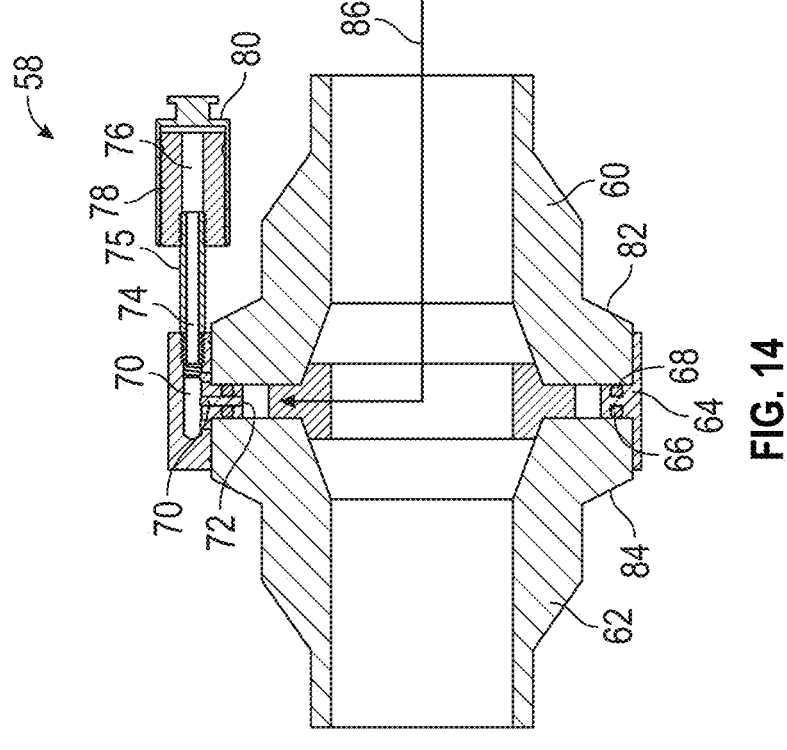
FIG. 14 is a cross sectional view of an assembled clamp connector showing the flow of gas from a leak.

Referring to FIG. 14, a cross sectional diagram of an implementation of a gas leak indication system 58 is illustrated during operation when installed in a clamp connector system. In this view, the clamp itself is omitted for purposes of easier illustration. As illustrated, the two hubs 60, 62 of the clamp connector system are illustrated in position with the sealring that would normally in place spacing the two hubs 60, 62 apart removed for ease of illustration of the gas flow. As illustrated, the ring 64 has been installed into the space between the two hubs 60, 62 created by the seal ring and o-rings 66, 68 are illustrated contacting the faces of the two hubs 60, 62, sealing the outer perimeter of the two hubs 60, 62 to gas flow. Flow opening 70 through flange 72 of the ring 64 is illustrated which is in fluid connection with the flow opening 74 of the extender 75. The flow opening 74 is also in fluid connection with the flow channel 76 of the indicator 78 over which cap 80 is currently coupled and held in place with a friction fit.

During operation, the two hubs 60, 62 are held together using a bolted clamp that has two flanges, one of which rests on the outer shoulder 82 of hub 60 and the other flange rests on the outer shoulder 84 of hub 62. Since the outer shoulders 82, 84 are slanted, the circumferential inward pressure exerted by the flanges of the bolted clamp (an example of which is illustrated in FIG. 13) press the faces of the hubs 60, 62 against the sealring with the goal of establishing a gas-tight fitting. As illustrated in FIG. 14, the flange 72 and o-rings 66, 68 are sized for each hub size used in clamp connectors and also sized to not interfere with sealring function when mating with hubs to create a gas-tight seal around the circumference of each hub 60, 62. This insertion of the flange into the space between the hubs has the benefit of providing an additional mechanical support/space at the edges of the hubs 60, 62 and maintain parallelism at the faces of the hubs 60, 62.

The gas leak indication system 58 previously described can be used in various implementations of a method of detecting a gas leak in a clamp connector. Referring to FIG. 14, as indicated by the gas flow arrow 86, any leaking gas from around the sealring flows into the space between edge of the sealring and the flange 72. Because of the seal provided by the flange around the hubs 60, 62, the only place for the gas 86 to escape this space is through the flow opening 70 in the flange 72 and up through the flow opening 74 of the extender 75 and into the flow channel 76 of the indicator 78. The leaking gas 86 then builds up pressure against the interior surface of the cap 80 since the tolerance of the cap 80 around the indicator 78 and/or the friction fit tolerance of the flange (not illustrated in FIG. 14) holding the cap 80 on the indicator 78 is sufficiently small to allow little to no gas flow able to relieve pressure build up from a leak. As a result, the pressure built up against the cap 80 causes the cap to disengage from the indicator 78 and pop off, exposing the entire outer surface of the indicator 78. Collectively, the extender 75, the indicator 78, and the cap 80 form a flow detection system in fluid communication with the flow opening 70 of the ring 64.

Now that the entire outer surface of the indicator 78 has been exposed, a technician or other maintenance worker can immediately see that a gas leak is occurring at this specific clamp connector in the system. As clamp connectors themselves do not come with any type of gas leak detection, in the past, when a gas leak was suspected either through gas monitors (as in the case of natural gas) or through abnormal gas consumption, the technicians would have to enter the facility and perform testing while in a potentially dangerous environment created by the leaking gas. During this process, each fitting would be leak tested separately with sniffers or a rag on a stick to attempt to locate the clamp connectors that were leaking. Because it can take a full day or more find a leak, immediate detection could significantly reduce downtime and increase operational safety. Furthermore, because of the seal provided by the flange of the ring, the maximum amount of gas that can leak to atmosphere is controlled by the size of the flow opening 70 in the flange 72. This ability to meter the quantity of gas leaking can reduce the likelihood of catastrophic or serious leaks when the gas leak indication systems is used for any clamp connector system. This ability to stabilize and control leaks may permit correction of the leak during a scheduled maintenance period rather than requiring immediate shutdown of a facility to avoid a hazardous condition.

In various method implementations, particularly during startup or initial testing of a clamp connector, the present gas leak indication systems can be used to detect leaks prior to full pressurization of the clamp connector. In such method implementations, instead of use of a flow detection system that includes the cap, indicator, and extender, a flow detection system that replaces the cap with a balloon is used. In such method implementations, a hand vacuum pump is used to draw a rubber balloon into the flow channel of the indicator prior to installation of the indicator and extender. The process of pressurizing the line in which the clamp connector is then begun. Since a balloon can begin to inflate at about $\frac{1}{10}^{th}$ psi, leaks below the threshold detection of the cap system (in some implementations, about 5 psi or higher) can be detected by a technician/operator observing the balloon beginning to inflate from the interior of the indicator, providing a clear visual signal that a leak is present. As the balloon enables detection of leaks as they are forming at a low pressure operational stage, this method implementation can allow for detection prior to having to reach full pressurization. For systems where it can take up to a day to bring the line up to full pressure, this ability to detect the leak in the clamp connector during pressurization can be very valuable and help greatly with evaluating repairs and new installations to ensure that delivery of the system or handover to operations can be completed on time or even ahead of schedule.

The various system and method implementations disclosed herein also have the ability to help with installation of the clamp connectors independent of their gas leak detection effects. Because the flange of the ring is inserted between the two hubs and dimensioned in combination with the o-rings to match a desired separation of the two hubs around the edges of the hubs, during tightening of the clamp, the flange of the ring can help ensure that the two hubs retain the desired spacing and parallelism. While the sealring is not designed to do this, the profile of the sealring's contact surface is radiused, making it difficult to maintain a parallel sealing surface during tightening causing one side of the hubs to have a wider or thinner separation than the other side. The ability to maintain a parallel spacing between the faces of the hubs around the joint provides a more uniform fit of the sealring to the flange and can ensure that a desired/design separation between the two hubs exists. The use of the ring and flange as part of the clamp connector creates a self-aligning effect that helps remove a source of potential leaks and misalignment where only a sealring alone is used. Because of this, the likelihood of successful creation of a functioning clamp connector can be substantially increased by use of the ring and flange, which reduces the likelihood that a leak would occur. Because of the use of the flow detection system in combination with the ring, the ability to detect a leak at a specific clamp connector can also be substantially increased. Finally, because the implementations of flow detection systems disclosed herein have the ability to meter the flow of leaking gas to that which can be carried by the flow opening of the ring, the amount of leaking gas can be correspondingly limited, which can reduce the release of gas which could lead to a hazardous situation during operation of a clamp connector until the system can be taken down to address the leak.

Referring to FIG. 16, a cross sectional exploded view of an implementation of a ring 114 adjacent to a sealring implementation 116 and hub implementation 118 is illustrated. This ring implementation contains a similar flange 120 to those disclosed herein that similarly includes o-rings 122, 124 installed in seal channels 126, 128 on each side of the flange 120. In this ring implementation 114 however, the flange 120 is not centered inside the ring, but offset so that there is space for an additional gripping channel 130 to be formed in the circumference of the ring into which an additional o-ring 132 is placed. As illustrated in FIG. 16, during assembly of the clamp connector, after placement of the sealring 116 against the hub 118, the ring 114 is inserted over the circumference of the hub 118 allowing the o-ring 132 in the gripping channel 120 to contact the outer curved surface of the hub 118. This allows the mechanical alignment of the ring 114 to be held in position relative to the hub 118 while the second hub of the clamp connector (not shown in FIG. 16) is placed into the ring against the o-ring 126 and the clamp is placed around the ring and two hubs and tightened. In this way, the gripping channel 130 and o-ring 132 work to reduce the number of mechanical degrees of freedom the two hubs and ring have during the assembly and further assist with ensuring that parallel sealing surfaces to the sealring are presented by both hubs, further reducing the likelihood of a leak occurring.

In the implementation of FIG. 16, a projection 134 is present in which flow opening 136 is included which may be any flow opening disclosed in this document coupled to any extender, indicator, and cap implementation disclosed herein. In this way, the ring 114 both helps with assembly to minimize leaks and also works to detect leaks during crank and during operation. While the use of a gripping channel 130 on just one side of the ring 114 is illustrated in FIG. 16, in other implementations, the width of the ring may be made wide enough to accommodate a second gripping channel and corresponding o-ring that is designed to receive the second hub and hold it in position while the clamp is applied and tightened. In such an implementation, the flange 120 would be centered inside the ring like the other ring implementations disclosed here.

Figure 17:
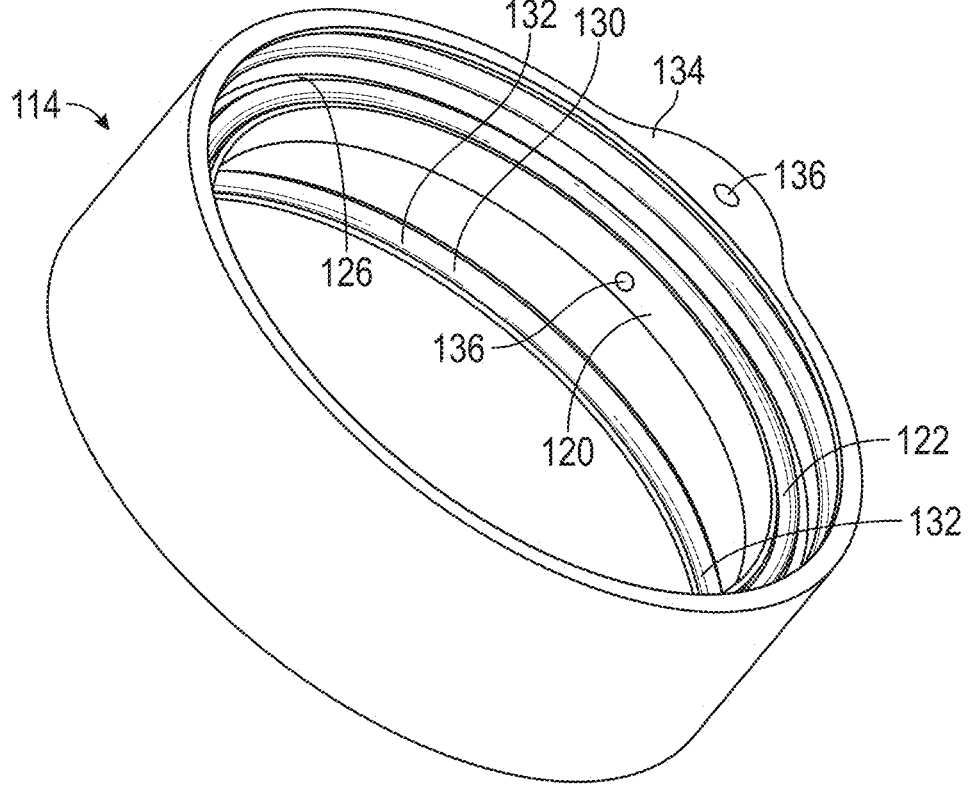
FIG. 17 is a perspective view of the ring implementation of FIG. 16.

Referring to FIG. 17, an implementation of the ring 114 is illustrated in a perspective view showing the position of the flange 120, flow opening 136, and gripping channel 130 with o-ring 132 installed therein. Also illustrated is o-ring 122 and in seal channel 126 along with projection 134. In this view the ability of the ring 114 to help grab/grip/hold the hub during installation is illustrated.

In places where the description above refers to particular implementations of gas leak indication systems and implementing components, sub-components, methods and sub-methods, it should be readily apparent that a number of modifications may be made without departing from the spirit thereof and that these implementations, implementing components, sub-components, methods and sub-methods may be applied to other gas leak indication systems.

What is claimed is:

1. A gas leak indication system comprising:
a ring comprising a flange extending from an interior surface of the ring, the ring comprising a flow opening, and the ring configured to rest against exterior surfaces of a clamp connector;
an indicator coupled to the ring, the indicator configured to continuously monitor for a leak from the clamp connector while gas flows through the clamp connector, the indicator comprising a flow channel extending therethrough in fluid communication with the flow opening of the ring;
wherein the indicator is threadedly coupled to an opening on a surface of the flange, the opening configured to orient the indicator substantially perpendicular to the clamp connector.

2. The system of claim 1, further comprising a balloon coupled to the indicator.

3. The system of claim 2, wherein the indicator comprises a flange extending around a circumference of the indicator adjacent to a first end of the indicator and a groove extending around the circumference of the indicator adjacent to a second end of the indicator configured to retain the balloon.

4. The system of claim 2, wherein when a predetermined flow of gas passes through the flow opening of the ring into the flow channel of the indicator, the balloon visibly expands.

5. The system of claim 1, further comprising a cap coupled to the indicator.

6. The system of claim 5, wherein the cap comprises a groove extending around an interior surface of the cap, the groove configured to receive a flange of the indicator therein.

7. The system of claim 5, wherein when a predetermined flow of gas passes through the flow opening of the ring into the flow channel of the indicator, the cap is configured to disengage from the indicator to fully expose the indicator.

8. The system of claim 5, wherein the cap comprises a cable coupling a top of the cap to the ring to retain the cap coupled to the ring.

9. The system of claim 1, wherein the flange is configured to rest between two hubs of the clamp connector adjacent to a sealring held between the two hubs and the ring is configured to be held against the exterior surfaces of the two hubs through a clamp coupled with the two hubs.

10. A gas leak indication system comprising:
a ring comprising a flange extending from an interior surface of the ring, the flange configured to extend between two hubs of a clamp connector, the ring comprising a flow opening therein and the ring configured to continuously monitor the clamp connector for a leak while gas flows through the clamp connector;
one of a cap or a balloon in fluid communication with the flow opening; and
an indicator threadedly coupled to an opening on a surface of the flange, the opening configured to orient the indicator at a substantially right angle to the clamp connector.

11. The system of claim 10, further comprising an indicator comprising a flow channel extending therethrough in fluid communication with the flow opening of the ring.

12. The system of claim 11, wherein the indicator comprises a flange extending around a circumference of the indicator adjacent to a first end of the indicator and a groove extending around the circumference of the indicator adjacent to a second end of the indicator configured to retain the balloon.

13. The system of claim 11, wherein the cap comprises a groove extending around an interior surface of the cap, the groove configured to receive a flange of the indicator therein.

14. The system of claim 11, wherein when a predetermined flow of gas passes through the flow opening of the ring into the flow channel of the indicator, the cap is configured to disengage from the indicator to fully expose the indicator.

15. The system of claim 11, wherein when a predetermined flow of gas passes through the flow opening of the ring into the flow channel of the indicator, the balloon visibly expands.

16. A method of detecting a gas leak in a clamp connector, the method comprising:
providing a ring;
forming a seal around a sealring of the clamp connector with the ring; and
continuously monitoring for a predetermined flow of leaking gas from the sealring utilizing an indicator in fluid communication with the ring;
wherein the indicator is threadedly coupled to an opening in a surface of a flange; and
wherein the indicator is oriented substantially at a right angle to the clamp connector.

17. The method of claim 16, further comprising coupling a balloon to the indicator.

18. The method of claim 17, wherein detecting the predetermined flow of gas includes observing a movement of the balloon.

19. The method of claim 16, further comprising coupling a cap over the indicator.

20. The method of claim 19, wherein detecting the predetermined flow of gas further comprises exposing the indicator through disengaging the cap from the indicator.

* * * * *